(12) United States Patent
Florek et al.

(10) Patent No.: US 8,583,493 B2
(45) Date of Patent: Nov. 12, 2013

(54) PAYMENT TERMINAL USING A MOBILE COMMUNICATION DEVICE, SUCH AS A MOBILE PHONE; A METHOD OF DIRECT DEBIT PAYMENT TRANSACTION

(75) Inventors: Miroslav Florek, Bratislava (SK); Michal Masaryk, Bratislava (SK); David Alan Riffelmacher, Prague (CZ)

(73) Assignee: Logomotion, S.R.O. (SK)

( * ) Notice: Subject to any disclaimer, the term of this patent is extended or adjusted under 35 U.S.C. 154(b) by 28 days.

(21) Appl. No.: 12/898,976

(22) Filed: Oct. 6, 2010

(65) Prior Publication Data

US 2011/0022482 A1 Jan. 27, 2011

Related U.S. Application Data

(63) Continuation of application No. PCT/IB2010/051915, filed on May 1, 2010.

(30) Foreign Application Priority Data

| May 3, 2009 | (SK) | 00032-2009 |
| Mar. 27, 2010 | (SK) | 50009-2010 |
| Apr. 8, 2010 | (SK) | 50012-2010 |
| Apr. 19, 2010 | (SK) | 50016-2010 |

(51) Int. Cl.
*G06Q 20/00* (2012.01)
(52) U.S. Cl.
USPC .................. 705/16; 705/21; 705/64
(58) Field of Classification Search
None
See application file for complete search history.

(56) References Cited

U.S. PATENT DOCUMENTS

| 5,574,470 A | 11/1996 | de Vall |
| 5,608,417 A | 3/1997 | de Vall |

(Continued)

FOREIGN PATENT DOCUMENTS

| CN | 1450782 | 10/2003 |
| CN | 1627321 | 6/2005 |

(Continued)

OTHER PUBLICATIONS

"EMV Mobile Contactless Payment: Technical Issues and Position Paper", www.emvco.com/mobile.aspx, © Oct. 11, 2007, accessed Apr. 20, 2009, 37 pages.

(Continued)

*Primary Examiner* — Luna Champagne
(74) *Attorney, Agent, or Firm* — Woodcock Washburn LLP (57) ABSTRACT

A payment terminal using a mobile communication device, such as a mobile phone, is located on a removable memory card (1) which is adjusted in such a way so it can be inserted into an additional hardware slot which is used to add functionalities that surpasses the basic functions of the mobile communication device. (4). A payment POS terminal application runs on a removable memory card (1), which also contains at least one payment card. The configuration data of the terminal's selected identity and the payment card's data are located in the separate parts of the secure element (3, 31, 32) or in completely independent secure elements (3, 31, 32). The payment card's unit (7) with the card's payment application is located in the secured part of the memory, separately from the terminal's configuration data unit (6). The memory card (1) is of SD type or miniSD or microSD card or an M2 card. The memory card (1) is capable of operating operate as a multi-identity terminal and it can also cooperate with several payment cards. In preferable configuration it is equipped with a contactless communication element. (13).

21 Claims, 6 Drawing Sheets

(56) References Cited

U.S. PATENT DOCUMENTS

| | | | |
|---|---|---|---|
| 6,062,472 A | 5/2000 | Cheung | |
| 6,070,795 A | 6/2000 | Feiken | |
| 6,070,796 A | 6/2000 | Sirbu | |
| 6,450,407 B1 | 9/2002 | Freeman et al. | |
| 6,615,243 B1 | 9/2003 | Meggeid et al. | |
| 6,745,935 B1 | 6/2004 | Grieu et al. | |
| 6,828,670 B2 | 12/2004 | Hayana et al. | |
| 6,976,011 B1 | 12/2005 | Capitant et al. | |
| 7,103,575 B1 | 9/2006 | Linehan | |
| 7,357,309 B2 | 4/2008 | Ghosh et al. | |
| 7,364,092 B2 | 4/2008 | Narendra et al. | |
| 7,374,100 B2 | 5/2008 | Jei et al. | |
| 7,436,965 B2 | 10/2008 | Sherman | |
| 7,458,518 B2 | 12/2008 | Fukuda et al. | |
| 7,481,358 B2 | 1/2009 | Honjo et al. | |
| 7,568,065 B2 | 7/2009 | D'Athis | |
| 7,581,678 B2 * | 9/2009 | Narendra et al. | 235/451 |
| 7,689,932 B2 | 3/2010 | Maktedar | |
| 7,775,442 B2 | 8/2010 | Saarisalo | |
| 7,775,446 B2 | 8/2010 | Ochi et al. | |
| 7,805,615 B2 | 9/2010 | Narendra et al. | |
| 7,828,214 B2 | 11/2010 | Narendra et al. | |
| 8,055,184 B1 | 11/2011 | Di Martino et al. | |
| 8,127,999 B2 | 3/2012 | Diamond | |
| 8,355,670 B2 | 1/2013 | White | |
| 2001/0005832 A1 | 6/2001 | Cofta et al. | |
| 2002/0038287 A1 | 3/2002 | Villaret et al. | |
| 2002/0062249 A1 | 5/2002 | Iannacci | |
| 2002/0147658 A1 | 10/2002 | Kwan | |
| 2002/0163479 A1 | 11/2002 | Lin | |
| 2003/0055738 A1 | 3/2003 | Alie | |
| 2003/0138135 A1 | 7/2003 | Chung et al. | |
| 2004/0019564 A1 | 1/2004 | Goldthwaite et al. | |
| 2004/0066278 A1 | 4/2004 | Hughes et al. | |
| 2005/0072595 A1 | 4/2005 | Cho | |
| 2005/0092835 A1 | 5/2005 | Chung et al. | |
| 2005/0116050 A1 | 6/2005 | Jei et al. | |
| 2005/0125745 A1 | 6/2005 | Engestrom | |
| 2005/0222949 A1 | 10/2005 | Inotay et al. | |
| 2005/0269401 A1 | 12/2005 | Spitzer et al. | |
| 2005/0269402 A1 | 12/2005 | Spitzer et al. | |
| 2006/0143578 A1 | 6/2006 | Maktedar | |
| 2006/0146023 A1 | 7/2006 | Kidron | |
| 2006/0152288 A1 | 7/2006 | Peng et al. | |
| 2006/0186209 A1 | 8/2006 | Narendra et al. | |
| 2006/0219776 A1 | 10/2006 | Finn | |
| 2006/0224470 A1 | 10/2006 | Garcia et al. | |
| 2006/0226217 A1 | 10/2006 | Narendra et al. | |
| 2006/0255160 A1 | 11/2006 | Winkler | |
| 2007/0014407 A1 | 1/2007 | Narendra et al. | |
| 2007/0014408 A1 | 1/2007 | Narendra et al. | |
| 2007/0016957 A1 | 1/2007 | Seaward et al. | |
| 2007/0106564 A1 | 5/2007 | Matotek et al. | |
| 2007/0106619 A1 | 5/2007 | Holdsworth | |
| 2007/0125840 A1 | 6/2007 | Law et al. | |
| 2007/0152035 A1 | 7/2007 | Adams et al. | |
| 2007/0158438 A1 | 7/2007 | Fukuda et al. | |
| 2007/0171079 A1 | 7/2007 | Saito | |
| 2007/0233615 A1 | 10/2007 | Tumminaro | |
| 2007/0235539 A1 | 10/2007 | Sevanto et al. | |
| 2007/0241180 A1 | 10/2007 | Park et al. | |
| 2007/0293155 A1 | 12/2007 | Liao | |
| 2008/0011833 A1 | 1/2008 | Saarisalo | |
| 2008/0048036 A1 | 2/2008 | Matsumoto et al. | |
| 2008/0059375 A1 | 3/2008 | Abifaker | |
| 2008/0093467 A1 | 4/2008 | Narendra et al. | |
| 2008/0103972 A1 | 5/2008 | Lanc | |
| 2008/0120129 A1 | 5/2008 | Seubert et al. | |
| 2008/0207124 A1 | 8/2008 | Raisanen et al. | |
| 2008/0233906 A1 | 9/2008 | Mitomo et al. | |
| 2008/0270246 A1 | 10/2008 | Chen | |
| 2009/0013418 A1 | 1/2009 | Okabe et al. | |
| 2009/0063312 A1 | 3/2009 | Hurst | |
| 2009/0065571 A1 | 3/2009 | Jain | |
| 2009/0065572 A1 | 3/2009 | Jain | |
| 2009/0069049 A1 | 3/2009 | Jain | |
| 2009/0069050 A1 | 3/2009 | Jain et al. | |
| 2009/0069051 A1 | 3/2009 | Jain et al. | |
| 2009/0069052 A1 | 3/2009 | Jain et al. | |
| 2009/0070272 A1 | 3/2009 | Jain | |
| 2009/0070691 A1 | 3/2009 | Jain | |
| 2009/0070861 A1 | 3/2009 | Jain | |
| 2009/0088077 A1 | 4/2009 | Brown et al. | |
| 2009/0098825 A1 | 4/2009 | Huomo et al. | |
| 2009/0108063 A1 | 4/2009 | Jain et al. | |
| 2009/0119190 A1 | 5/2009 | Realini | |
| 2009/0124273 A1 | 5/2009 | Back | |
| 2009/0143104 A1 | 6/2009 | Loh et al. | |
| 2009/0157936 A1 | 6/2009 | Goss et al. | |
| 2009/0191812 A1 | 7/2009 | Teruyama et al. | |
| 2009/0193491 A1 | 7/2009 | Rao | |
| 2009/0199206 A1 * | 8/2009 | Finkenzeller et al. | 719/313 |
| 2009/0199283 A1 | 8/2009 | Jain | |
| 2009/0200371 A1 | 8/2009 | Kean et al. | |
| 2009/0261172 A1 | 10/2009 | Kumar et al. | |
| 2009/0265544 A1 | 10/2009 | Moona et al. | |
| 2009/0265552 A1 | 10/2009 | Moshir et al. | |
| 2009/0298540 A1 | 12/2009 | Narendra et al. | |
| 2009/0307139 A1 | 12/2009 | Mardikar et al. | |
| 2009/0307142 A1 | 12/2009 | Mardikar et al. | |
| 2009/0319287 A1 | 12/2009 | Hammad et al. | |
| 2010/0012721 A1 | 1/2010 | Jain et al. | |
| 2010/0023449 A1 | 1/2010 | Skowronek et al. | |
| 2010/0044444 A1 | 2/2010 | Jain et al. | |
| 2010/0045425 A1 | 2/2010 | Chivallier | |
| 2010/0062808 A1 | 3/2010 | Cha et al. | |
| 2010/0063893 A1 | 3/2010 | Townsend | |
| 2010/0181377 A1 | 7/2010 | Chen et al. | |
| 2010/0197224 A1 | 8/2010 | Lahdenniemi et al. | |
| 2010/0203870 A1 | 8/2010 | Hubinak et al. | |
| 2010/0205432 A1 | 8/2010 | Corda | |
| 2010/0213265 A1 | 8/2010 | Narendra et al. | |
| 2010/0258639 A1 | 10/2010 | Florek et al. | |
| 2010/0262503 A1 | 10/2010 | Florek et al. | |
| 2010/0274677 A1 | 10/2010 | Florek et al. | |
| 2010/0274726 A1 | 10/2010 | Florek et al. | |
| 2010/0323617 A1 | 12/2010 | Hubinak et al. | |
| 2011/0196796 A1 | 8/2011 | Florek et al. | |
| 2011/0264543 A1 | 10/2011 | Taveau et al. | |
| 2011/0282753 A1 | 11/2011 | Mullen et al. | |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |
| EP | 1943606 A2 | 7/2008 |
| EP | 2390817 | 11/2011 |
| FR | 0611189 | 9/1926 |
| FR | 0611190 | 9/1926 |
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |

(56) References Cited

FOREIGN PATENT DOCUMENTS

| | | |
|---|---|---|
| JP | 2006-033229 | 2/2006 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0012738 | 2/2002 |
| KR | 2002-0051696 | 6/2002 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 03/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/105469 | 9/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO 2010/041245 | 4/2010 |
| WO | WO 2010/044041 | 4/2010 |
| WO | WO 2010/097777 | 9/2010 |
| WO | WO 2010/122520 | 10/2010 |
| WO | WO 2010/128442 | 11/2010 |
| WO | WO 2010/131226 | 11/2010 |

OTHER PUBLICATIONS

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure A Smart Card Alliance Contactless Payments Council White Paper", www.smartcardalliance.org, © Sep. 1, 2007, accessed Nov. 7, 2008, 10 pages.

Madlmayar et al., "Management of Multiple Cards in NFC-Deivces", LNCS, 2008, 21 pages.

Balfe et al., "Augmenting Internet-Based Card not Present Transactions with Trusted Computing: An Analysis", Royal Holloway, University of London, Oct. 16, 2006, 25 pages.

Balfe et al., "e-EMV: Emulating EMV for Internet Payments with Trusted Computing Technologies", Royal Holloway, University of London, Oct. 31, 2008, 12 pages.

Khu-Smith et al., "Using EMV Cards to Protect E-Commerce Transactions", Information Security Group, Royal Holloway, University of London, 2002, 12 pages.

"Intelligent Mouse", IBM Technical Disclosure Bulletin, International Business Machines Corp., Thornwood, US, Feb. 1, 1995, 38(2), p. 463.

Finkenzeller (Ed.), "RFID—Handbuch: Grundlagen und praktische Anwendungen Induktiver Funkanlagen, Transponder und kontaktloser Chipkarten", Jan. 1, 2002, 225-231 (English abstract attached).

Wikipedia, "Bluetooth", Wikipedia, The Free Encyclopedia, http://enwikipedia.org/wiki/bluetooth, accessed Apr. 8, 2012, 19 pages.

Wikipedia, "Cellular Frequencies" Wikipedia, The Free Encyclopedia, http://en.wikipedia.org/wiki/cellular_frequencies, accessed Apr. 8, 2012, 5 pages.

\* cited by examiner

PAYMENT TERMINAL USING A MOBILE COMMUNICATION DEVICE, SUCH AS A MOBILE PHONE; A METHOD OF DIRECT DEBIT PAYMENT TRANSACTION

CROSS-REFERENCE TO RELATED APPLICATIONS

This application is a continuation of PCT Application No. PCT/IB2010/051915, filed May 1, 2010, which claims priority from Slovak patent applications nos. PP00032-2009, filed May 3, 2009, PP50009-2010, filed Mar. 27, 2010, PP50012-2010, filed Apr. 8, 2010, and PP50016-2010, filed Apr. 19, 2010. The entire disclosure of each of the above-referenced patent applications is hereby incorporated herein by reference.

TECHNICAL FIELD

The solution refers to a payment terminal located in a mobile communication device, such as a mobile phone. To realize payment processes the terminal can communicate even through its own communication element, mainly of the NFC type. The invention presented also describes a method of direct debit payment, for example, using a contactless transmission link and describes a configuration, in which a temporary payment terminal, with simplified structure that is intended above all for small business premises, can be created using a mobile communication device.

BACKGROUND

The payment terminals, POS (Point of Sale) terminals that are located permanently in commercial premises are known. The POS terminal works in such a way, that the transfer of money from the purchaser's account to the shop operator's account is secured within an agreed system. Up till now, the payment over POS terminal was characterized as a payment, in which the payment's recipient has a POS terminal and the paying customer uses a corresponding card as a payment device. In the first phase, a check, verification of the card holder is run. This process should be highly secured and should be realized without unreasonable effort on the side of both the merchant and the paying customer. Subsequently, a process in which the paid amount is automatically credited to the shop operator's account is run. Originally, cards equipped only with a magnetic stripe were used for the run of payment-terminal application. However, with respect to the technical restrictions, the magnetic stripe with loaded data presented a security risk, since the magnetic stripe could be copied or changed with the use of simple technical devices. Reading of internal data from magnetic stripe is low-tech.

Therefore, an agreement on creation of EMV standard using microchip located on the payment card was made between the card issuers Europay International, MasterCard and VISA in the second half of the nineties. EMV (Europay MasterCard Visa) standard describes interaction between the payment card chip and POS terminal for the purpose of ensuring worldwide interoperability. The usage of microchip enables to protect data located on it in such a way that it is not possible to access them from the outside without a PIN. The usage of chip on the card also enables the Cardholder Verification to be realized even without online connection to the processor centre. While magnetic stripe represented a passive data carrier, the chip on the card is basically a small computer with its own computing capacity, with secured parts of the memory and with a data encryption unit. Despite the mentioned technical characteristics of the current POS terminals, it was discovered that in case of fraudulent adjustments and manipulations in the insides of the POS terminal or in case of inserting an intermediary link to the reading device, the data from the card and the PIN code can be disclosed. It usually happens without the knowledge of the owner of the shop with the POS terminal and even then usually in case of insufficient control by the attending personnel or by other fraudulent way.

However until now, there are not known such technical tools that would enable converting the mobile phone into that kind of payment terminal, which would be owned by the paying customer and which would have the security required by the individual participants of the entire business relationship (payment card issuer, processing centre, bank, merchant).

The solution under the CN101351819 patent indicates the possibility of using a mobile phone as a POS terminal; however it does not deal with specific organization of individual essential elements of the system. Many solutions, such as the ones under the patents CN101339685, CN101329801, US2008270246 (A1), SI22595 (A), US2008059375 describe the mobile phone's involvement in direct debit payments, notwithstanding there are no independent POS terminal elements directly in the phone. Or, as it is in the US20077241180 (A1) file, there are solutions in which a mobile phone and a static POS terminal interact.

There is a need for such a technical solution which will have the high security of EMV payment application and which will produce final payment cryptograms exactly in the form of EMV standards and all that even in case of internet payments or other payments realized outside the normal stores, e.g. in case of paying for download of programs that are stored at the mobile handset makers' websites. These kinds of solutions are either not known at the moment or they have security risks that reside in the fact there might come to be disclosed or misused the communication during the data transfer from the paying customer's payment card to the merchant's POS terminal or virtual POS terminal e.g. over internet or in case of NFC or GPRS communication. In case the original close contact between the POS terminal and the payment card in a normal store is lengthened to the communication over internet environment, then the security risks are increased.

The existing POS terminals are distinguished by a stable structure, which besides other things includes a communication channel connected to the payment processing centre, a printer, an encryption key, a card reader, which is mainly a reader of different format cards, and also a keyboard for PIN code entering. This kind of technical configuration requires certain space and it is relatively expensive. The currently known POS terminals are intended for stable sale locations in physical shops, where high costs of purchase, installation and operation of POS terminals are offset by reasonable turnovers of payments for purchases.

The solution according to the published patent WO2008063990 describes a system in which the POS terminal does not have a communication channel with the payment processing center and uses a mediated connection over the customer's mobile phone for it. This solution has lower security because the payment terminal application itself runs on a remote computer and the mobile phone is only a mediator of communication. Other published patents describe divided POS terminal in such a way in which directly on the payment location there is only its managing part that is connected to the remaining part located in some other part of the shop. The existing solutions and published patents do not offer simple instruction of how to create a cheap, non-complicated and eventually also portable POS payment terminal, which would create payment cryptograms according to the current standards, above all the EMV standards.

All solutions currently existing require relatively complicated installation and encompass many input and output devices, which increases their price. Until now, there are no such devices known that would be characterized by both simplicity, high security and that would be portable and usable even in small shops such as in newspaper kiosks or in mobile counters selling fast food.

SUMMARY

The deficiencies mentioned are to a great extent eliminated by a payment terminal using a mobile communication device, such as a mobile phone, in which the payment terminal contains a memory, an interface, and a microcontroller. The microcontroller is linked to the memory and through an interface also to the mobile communication device's circuit. The payment terminal has one unit with a payment POS terminal application and also a payment terminal's configuration data unit, which is stored in the secured part of the memory. The quintessence of the invention is in the fact that the payment terminal, along with the relevant configuration data, can be stored on a removable memory card, which is adjusted in such a way, so it could be inserted into the mobile communication device's slot for additional hardware, which is used to add functionalities that are surpassing the basic functions of the mobile communication device.

The quintessence of the solution is the configuration in which the entire process kernel of the POS terminal can be located on a removable memory card which is inserted into the mobile communication device while the most probable usage resides in its insertion into the common memory slot of the mobile phone. The run of all internal payment POS terminal applications can be realized on the removable memory card inserted into the mobile communication device. The exception can be found in the communication processes with the payment processors headquarters, in which communication channels (SMS—short message service, GPRS—general packet radio service) of the mobile communication device itself can be used. The mobile communication device's displaying tools can be used to display the run of the payment application.

The transfer of only the POS terminal's processing kernel into the supplementary memory card in the mobile phone brings along surprising technical advantages, but it would also cause complications with data loading from the payment card, since mobile phones do not have chip card readers. The important characteristic of the solution presented is then even the fact that on the same hardware equipment, i.e. on the removable memory card, a payment card or even several payment cards of the user can be placed. Technically this can be ensured in such a way that besides the secure part of the memory with the data for the payment terminal the removable memory card can also contain a separate secured part of the memory with the payment card data.

During the run of the payment application, the removable memory card is inserted into the mobile communication device's slot for additional hardware, which is used to add functionalities that surpass the basic functions of the mobile communication device. The slot will be mainly, however not exclusively, the commonly used slot that is accessible from the outside of the mobile communication device, such as a mobile phone. The relevant slot is designed for such a technical equipment, without which the mobile communication device can meet its essential function. The slot in question therefore does not influence transmission of data and/or voice in the operator's network directly; the fact in which it is different from the interface for the SIM (subscriber identity module) card. The memory card, which is an important element of this invention, does not have the functionality of the SIM card. The removable memory card, described in the solution in question, is not dependent on the mobile phone's SIM card and can be normally be removed or inserted into the mobile phone without interrupting any of the regular functions of the phone.

In this case where the communication between the payment card and the POS terminal is narrowed to data transmission within one hardware device which is inserted in the mobile phone during the run of the application, then it is not possible to monitor and misuse this communication by common means. After the payment is realized, encrypted information about the realized payment is sent from the removable memory card. This information is distinguished by sufficient security in the form of EMV standard. In common configuration the mobile communication device can be a mobile phone, which will ensure outside functions as the communication with the payment processing headquarters for the run of the payment application on the removable memory card. The mobile phone will also ensure powering of the removable memory card.

The removable memory card can encompass even a payment card unit with a payment application, mainly of the EMV type. This kind of payment card unit will encompass hardware and software tools for the assurance of similar functions as the chip has according to the EMV standard. The interfaces of this unit can be different since it is not designed to be read in normal type of readers, but it will be firmly, undetachably connected with the removable memory card's carrier.

Placing the POS payment terminal and payment card into one, moreover indivisible hardware equipment, made no sense until now, because the terminals were physically placed at the merchant's while they were usually owned by the bank, payment processor etc. Through the solution presented, it can be achieved for the user to leasehold the payment terminal and that being the case, it is possible to place the payment terminal and the payment card into one hardware equipment. From the configuration identity point of view, the terminal will remain in the possession of a specific bank or processing institution as it was normal until now with the terminals that were placed at the merchant's. Because the communication between the payment card and the POS terminal is going to run through the controller, the microcontroller in the removable memory card's hardware and given the miniature size of the payment device, then in essence, it will be technically unfeasible to read this communication illegally from the outside.

Delicate data of the POS payment terminal, just like the encryption keys and identification data, must be stored in the secured part of the memory, preferably in the so-called Secure Element. The Secure Element is characterized by specified hardware characteristics and is subject to corresponding certification thanks to which the participating members of payment card schemes are willing to trust their delicate data into such a memory device. These POS payment terminals' data must be strictly separated from the access to the payment card data and vice versa. For this reason, at least two independent, separate secure memory domains can be on the removable memory card. These can be e.g. in the form of separate partitions of one secure element.

From the point of view of optimizing the processes in the payment terminal application, it is advantageous, but not necessary, if the removable memory card has two independent hardware Secure Elements. These can be in the form of two uniform chips, which can be placed independently on the printed circuit of the removable memory card. Then the first Secure Element can be intended for storage of POS terminal data or storage of different POS terminals' data respectively. The second Secure Element will be intended for the storage of either the payment card's data or data of various payment cards. So the solution presented enables the placement of POS terminals of several operators and also several payment cards of one user (so payment cards of various banks issued on the name of one person) to one hardware device. Because from the access point of view these configuration and payment data, belonging to different companies, must be located separately, the Secure Elements will be divided into several independent domains, partitions. In case two Secure Elements are used, then their mutual communication and the run of two applications will be enabled even in the case, when the Secure Element will not have multi-tasking. The usage of two, or several Secure Elements, increases the total memory capacity available in such a way that the payment POS terminal application can run directly on the Secure Elements. In configuration with one Secure Element it will be more suitable to use another, mostly cheap and unsecured memory to which the payment POS terminal application will be loaded and on which it will run during payment process.

Besides containing the common memory itself, the memory card can hold a Secure Element in the form of a chip with secure memory, in which a unit with the terminal's configuration data is stored. This unit is used for secure storage of data the terminal needs to assign its own identity. In principle these are mostly data determining to whom the terminal with the relevant data belongs.

The Secure Element is connected with the microcontroller. The term microcontroller can mean even controller or just some narrowed hardware in the form of a controller. The microcontroller can be located also in such a way, in which its functions are divided, e.g. the controller part is divided from the computing part in another chip. In order to be able to run the payment POS terminal application, the microcontroller can be also connected to the memory card's memory, in which the unit with payment POS terminal application is stored. This application can be particularly in the form of an EMV application. The microcontroller reads the payment POS terminal application from the respective unit by which it becomes a so called Generic POS Terminal. It is a general POS payment terminal, though at this moment still indifferent (in particular, not associated with a specific bank or merchant). In order for the POS payment terminal to become associated with some specific bank, specific institution, it has to download the terminal configuration data from the selected unit in the smart card chip.

This configuration enables the insertion of a memory card that is configured and adapted in such a way that it can realize payment POS terminal operations into a common mobile phone which has a slot for memory extensions.

The payment card unit will be located in a secured part of the memory, separately from the unit with terminal configuration data, preferably on independent domains of the Secure Element in a specialized chip. As for the suitable structure of the memory card and with respect to high penetration of the mobile communication devices with the SD slot it is suitable for the card to be of SD type, or miniSD, or microSD card or perhaps even M2 (Memory Stick Micro). Then the memory card's interface towards the mobile communication device's circuit will be of the SD or M2 type of interface. The microcontroller can be connected to the card's interface as stated by the specification defined by the SD Card Association (Technical Committee SD Card Association).

In order to reach sufficient data permeability, it can be suitable if the payment card had at least a two-conductor, or better a four-conductor data bus. It is preferable for the card to have the largest parameter smaller than 24 mm and the second largest parameter smaller than 14 mm.

The microcontroller can be equipped with undeletable internal memory, preferably of EEPROM type. In order to achieve a sufficient level of security, the microcontroller can also contain a boot-loader unit for control of unauthorized interventions in the loaded POS payment application. The boot-loader can be located in the read-only part of the microcontroller processor memory and it runs after each reset of the terminal. The boot-loader function is there to control whether the operating system or application programs were not changed by any unauthorized intervention. After each reset, the boot-loader calculates the Hash value (digital signature) from the contents of the program's external flash memory, where the operating system and the applications are stored. Then it compares the result with the value stored in the EEPROM internal memory. If the data are equal then the boot-loader leaves the management to the operating system. If not, then the boot-loader decrements the counter of unsuccessful attempts and then stops. In case the counter reaches 0, it is not possible anymore to start-up the microcontroller. In the memory, there can be an operating system stored (as a beginning and an end of the addressed area), while the Hash value of the memory's capacity (digital signature) is stored into the microcontroller during the first operating system and application save. Later on, it is not possible to change this data anymore.

In common version, the microcontroller can have the 32-bit microprocessor structure.

The utility of the terminal can be increased significantly by such a configuration in which the payment terminal can have its own communication channel i.e. it is in principle independent of the mobile device's communication paths. This configuration version will be characterized by the memory card containing a contactless communication element that is connected to secure elements and/or a microcontroller. It is preferable if there is an antenna located directly on the memory card and if the antenna is connected to contactless communication element. In this way the functional independence of the terminal will be achieved. The contactless communication element can be equipped with a detection of surrounding electromagnetic field due to which its circuits will be activated only at the time of required connection which will cause the terminal's energetic demand to lower. The terminal can be powered by the electromagnetic field and by the mobile phone's power supply through the relevant memory card's interface. The contactless communication device can be linked to all the units on the Secure Element, with exception of the encryption unit, which will be accessible only through microcontroller to lower the risk of unauthorized breach of the code. With respect to existing distribution of communication types it is preferable for the communication element to be of the NFC type according to ISO 14443 Standard.

The payment terminal can have more individual units with configuration data from different independent terminals in the Secure Element. These will be stored in separate domains of the Secure Element. This technical solution will enable the payment terminal to activate into a terminal belonging to different payment processors. This ability will depend on the user's choice or on other commands. In this way one memory card can subsume and run sequence functions of several independent payment terminals. This configuration will be advantageous especially when the mobility of the payment terminal described and its independency of a particular merchant is considered or when it will be preferable to have the possibility of choosing the payment terminal's identity and ownership.

The payment terminal can also contain several payment cards by having several independent units holding independent payment cards with their respective payment applications in the Secure Element. So the payment terminal can be not only a multi-payment terminal but also a multiple card. With the increasing number of cards owned by one user, this solution will create space for comfortable and safe union of these payment means into one memory card that is inserted into a mobile phone.

The memory card's memory, preferably in the form of a flash memory, can have at least one part of its space protected. That being the case, a payment POS terminal application unit can be stored into this memory. This unit could be located even directly in the microprocessor or in the Secure Elements, but in some circuit board architectures this kind of solution could not be flexible sufficiently when the required size of the memory area is considered. Moreover, it will be required for the payment POS terminal application to be gradually updated, the activity that could be carried out by the download management unit that is stored in the memory. The memory card can be equipped with the memory controller processes unit used for data flow management. If there is any need for communication between a memory card and a mobile phone through web interface, a web server unit can be included into the memory card.

According to the description presented, the terminal's utility will be increased by extending it for functions of non-financial character. Existing elements of the memory card, independent Secure Element domain, contactless communication element and also encryption unit can be used to control external devices e.g. remote control, electronic key to the gate etc. In that case, a non-financial application unit that is initialized over the microcontroller can be in the secure element or in the governing smart card chip.

In configuration according to this solution the memory card with the payment terminal function can fulfill further even the function of extended memory of the mobile communication device. In unprotected part the memory can have area for freely accessible data of the user as are pictures, music files and similar. This part is directly visible when viewing the mobile communication device. In the memory for data that are hidden from the user there can be system data as records of the payment transaction results and similar.

The system can be supplemented for the payment POS terminal application initiator for the purposes of paying in a standard shop; the initiator can be in the form of a simple hardware element or it can be a part of the cash register. The initiator can have payment value generation unit. The merchant enters the amount of required payment over the initiator. This amount can be also generated as the final purchase amount output from the cash register. The initiator is attached to or is equipped downright with the communication element, which is compatible with the communication element on the removable memory card or with the short distance communication element of the mobile communication device.

According to this invention, the direct debit (for example) way of payment using a mobile communication device is based on the fact, that the payment POS terminal application can run on the removable memory card that is inserted into the mobile phone's slot for additional hardware and the payment card application also runs on the same hardware device. The run of the payment POS terminal application that was known up till now was characterized by the fact, that the payment card was connected to the POS terminal temporarily, during the realization of the payment. According to the solution presented, the payment card is firmly connected to the payment terminal and therefore the communication between the POS terminal and the payment card can run directly over the payment card's circuits. Various new payment application procedures possibilities follow from this technical solution and in principle the payment POS terminal application's result can be in the format used today—the EMV payment cryptogram.

In one of the possible procedure versions, the payment POS terminal application is loaded into the microcontroller in the memory card and subsequently the configuration data of the selected terminal's identity are loaded from the corresponding Secure Element. The important feature is also the possibility of loading the payment card data from Secure Element into the microcontroller, which operates as payment terminal, so the data are loaded from the same kind of hardware equipment used by the payment POS terminal application uses for its run. In case the security element has sufficient computing capacity, the payment POS terminal application can run directly in the Secure Element. This will happen e.g. in case two Secure Elements are used, one for payment terminal, another for payment cards. Even in this configuration the payment POS terminal application can be created as an indifferent, common one for all payment terminals' identities; and the identification data from the corresponding, independent domain of the Secure Element are loaded into the payment POS terminal application only after the payment terminal is selected. The version using independent payment POS terminal application with already inserted configuration data is also not eliminated.

To increase the level of security, it is preferable the bootloader runs the changes control in the payment POS terminal application before running the payment POS terminal application itself The payment POS terminal application will be managed through an input device of the mobile communication device, mainly keyboard.

DESCRIPTION OF DRAWINGS

The solution is explained in detail on the FIGS. 1 to 6.

On the FIG. 1, there is a block scheme of the memory card's individual elements with displayed connection between individual elements on the memory card with one divided secure element, on which there are protected data from payment POS terminal also from several payment cards.

The FIG. 2 presents a solution in which there is a mobile phone with a memory card during payment in an internet shop or during payment for downloaded files from the mobile network.

On the FIG. 3 there is removable memory card of the microSD type with two independent Secure Elements and with the communication element that is located directly on the memory card just like antenna is.

On the FIG. 4 there is a pre-paid removable memory card with a simplified architecture in the option with two secure elements.

On the FIG. 5 there is succession of tasks within payment application running on the removable memory card while paying for the file offered in the mobile network.

On the FIG. 6 there is a solution with the payment initiator, where the initiator is located practically permanently next to the cash register in the physical shop.

EXAMPLES OF APPLICATION

Example 1

Figure 3:
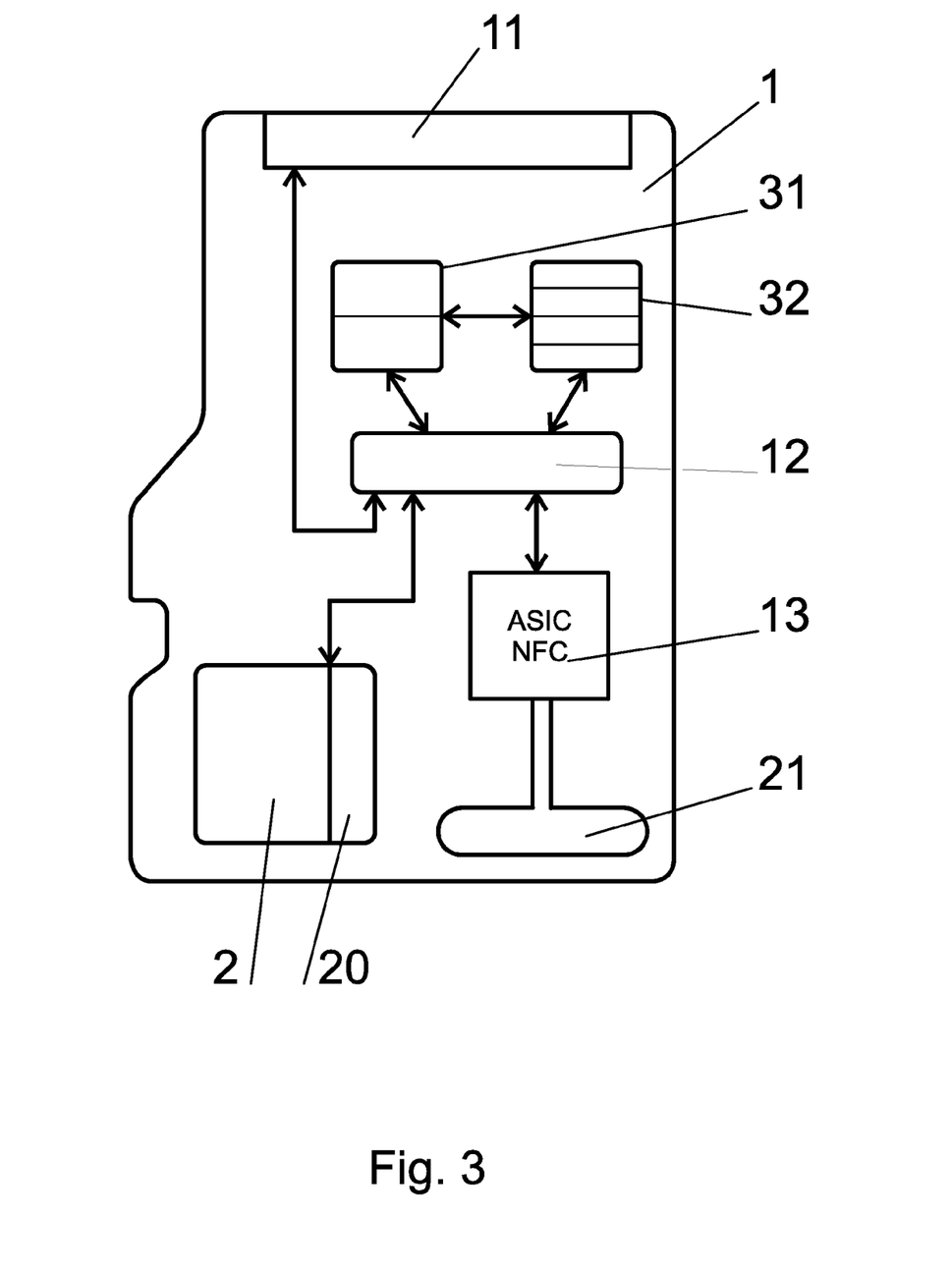

In this example there is description of the solution with two independent Secure Elements 31, 32 according to the FIG. 3. The usage of separate hardware Secure Elements 31, 32 simplifies certification requirements, which are set by individual participants of the payment system (the card's issuer, clearing center operator) on the storage of their sensitive data on the Secure Elements 3, 31, 32. In this example, each of the Secure Elements 31, 32 is also divided into independent domains, which can be offered to different card issuers and to different owners of the POS terminals' configuration data. The Secure Elements 31, 32 are in the form of independent chips on the circuit board, where they are connected with the controller, which fulfills the role of the microcontroller 12. Their interface towards the controller 12 is the ISO 7816. The removable memory card 1 is in the form of the microSD card. ASIC (application-specific integrated circuit) chip, which is set to execute the NFC platform communication processes and by doing that it is fulfilling the function of the communication element 13, is connected with the microcontroller 12. The antenna 21, which is located directly on the removable memory card's body 1, is designed in accordance with different patent filings of the patentee and is connected to the ASIC chip in such a way that it enables NFC communication, which is independent of other hardware of the mobile phone 4. The removable memory card 1 contains also a common flash memory 2, e.g. with the capacity of 2 GB. The user cannot access one part 20 of the memory 2 from the mobile phone's interface 4; this part of the memory is used for the archiving of realized payments records. The rest of the memory 2 is used for common storage of music, pictures and similar, thanks to which the entire memory card 1 appears to be a common memory media to the user. By placing the POS terminal and the payment card onto a removable memory card 1, the initial function of the mobile phone's 4 slot designed to extend memory capacity, did not disappear.

The payment can run in two different varieties. For example, as shown in the FIG. 6, the user of the mobile phone 4 decides he wants to buy a map in the electronic form in an internet shop. In this case the operator of the internet shop can be the mobile phone 4 producer. The microSD memory card 1 produced in accordance with the technical solution described, is inserted into the lateral slot that is accessible from the outside of the mobile phone 4. On the secure element 31 there are stored the POS terminal configuration data 6 belonging to several people, among them even an internet shop's operator. After selection of the item being purchased, a request for payment of corresponding amount is sent from the internet shop into the mobile phone 4. The user presses the payment button, with which the phone is equipped. In another payment example, the payment selection can be initialized by the software button displayed on the mobile phone's 4 display. The request for the launch of the payment POS application is sent to the interface 11. The payment POS terminal application runs on the memory card 1 in the same way as it does in case of a relationship between a standard POS payment terminal and the payment card, which is inserted in the POS terminal's reader. The mobile phone's 4 display is used to manage the run of the payment. The user selects the payment card from which he wants to pay the required amount. After activating the application in the corresponding unit 7 of the selected payment card, the run of the payment can be also managed by the preset rules of the risk management of the corresponding card's issuer. Depending on this, it will be or it will be not necessary to enter the payment card's password.

Figure 6:
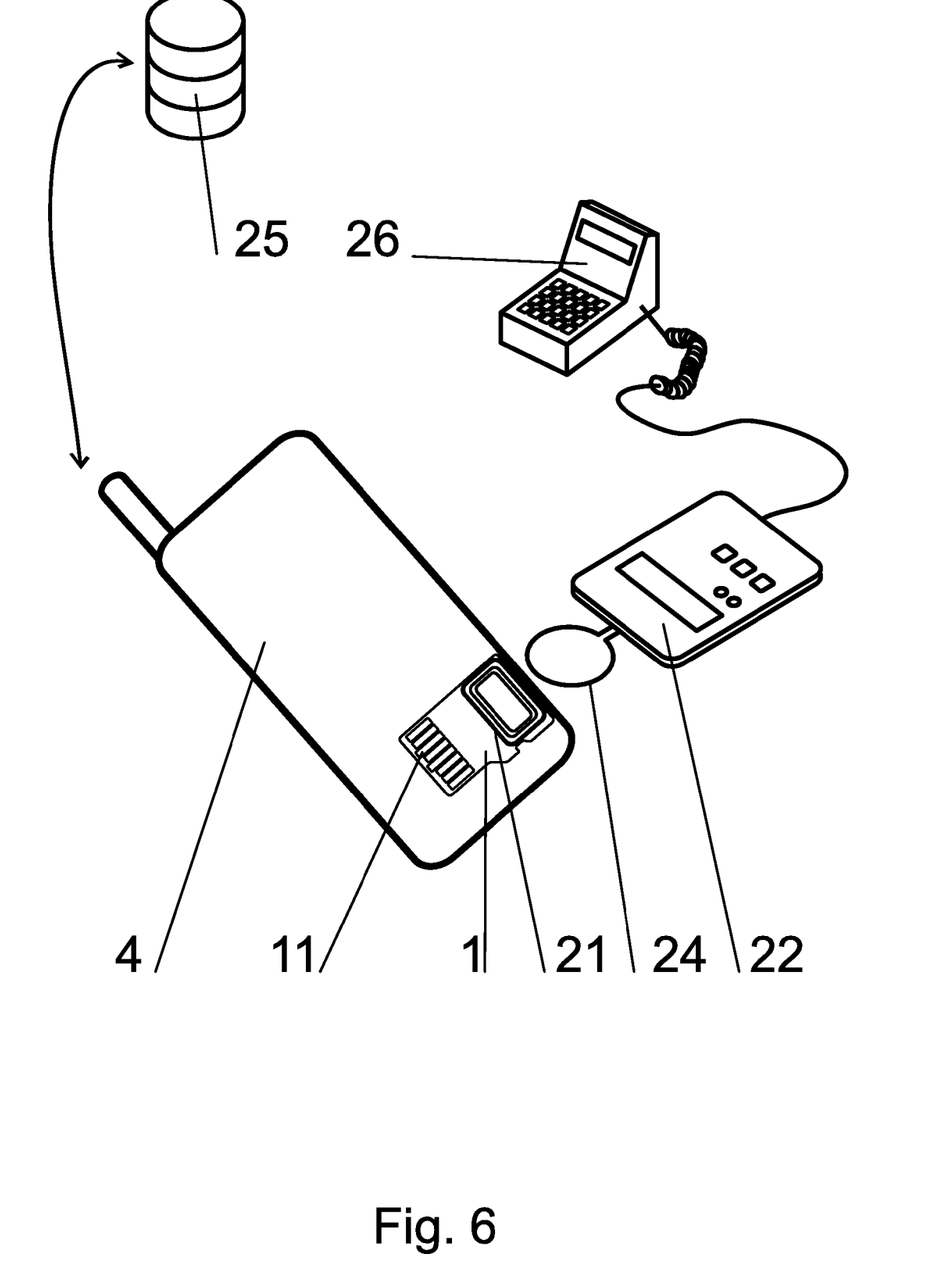

After ending the payment POS terminal application, the connection between the POS payment terminal and the payment card is disconnected by the software and the resulting payment cryptogram is sent over GPRS channel to be processed in the internet store. After the internet store receives and decrypts the payment file, the payment is evaluated and in case of an affirmative result the item that was paid for, in this example the map, is sent to the mobile phone 4.

Example 2

The payment terminal on the removable payment card 1 platform of the microSD type that is comparable in shape and parameters to a standard microSD card is described in this example. The payment card 1, as in FIG. 1, has a microcontroller 12 in the form of 32-bit microprocessor that operates on multi-task operating system 8—in this example it is Linux. A flash memory 2, a Secure Element 3, and a SD interface 11 are connected to the microcontroller 12. The microprocessor 12 contains an internal EEPROM memory 10 and boot-loader unit 9 that controls non-authorized interventions in the loaded payment POS terminal application.

Figure 1:
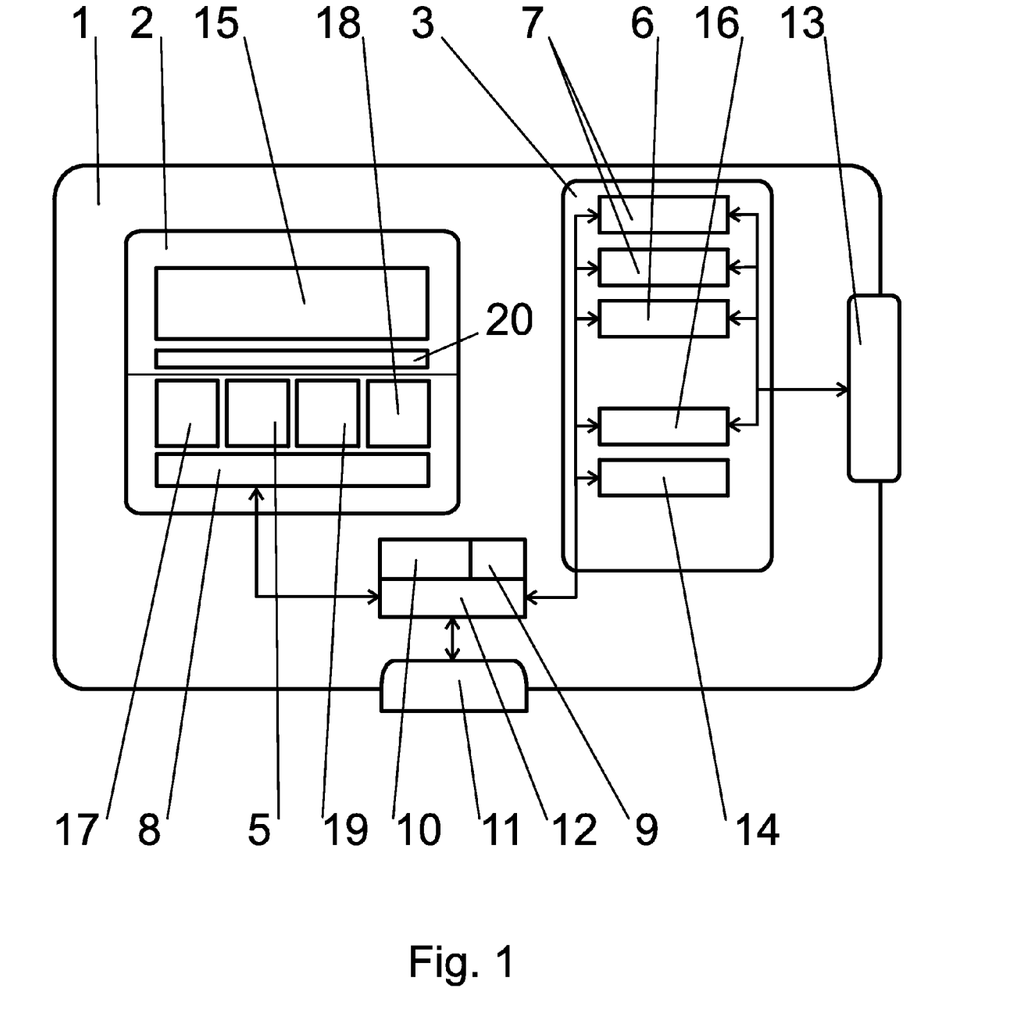
Figure 2:
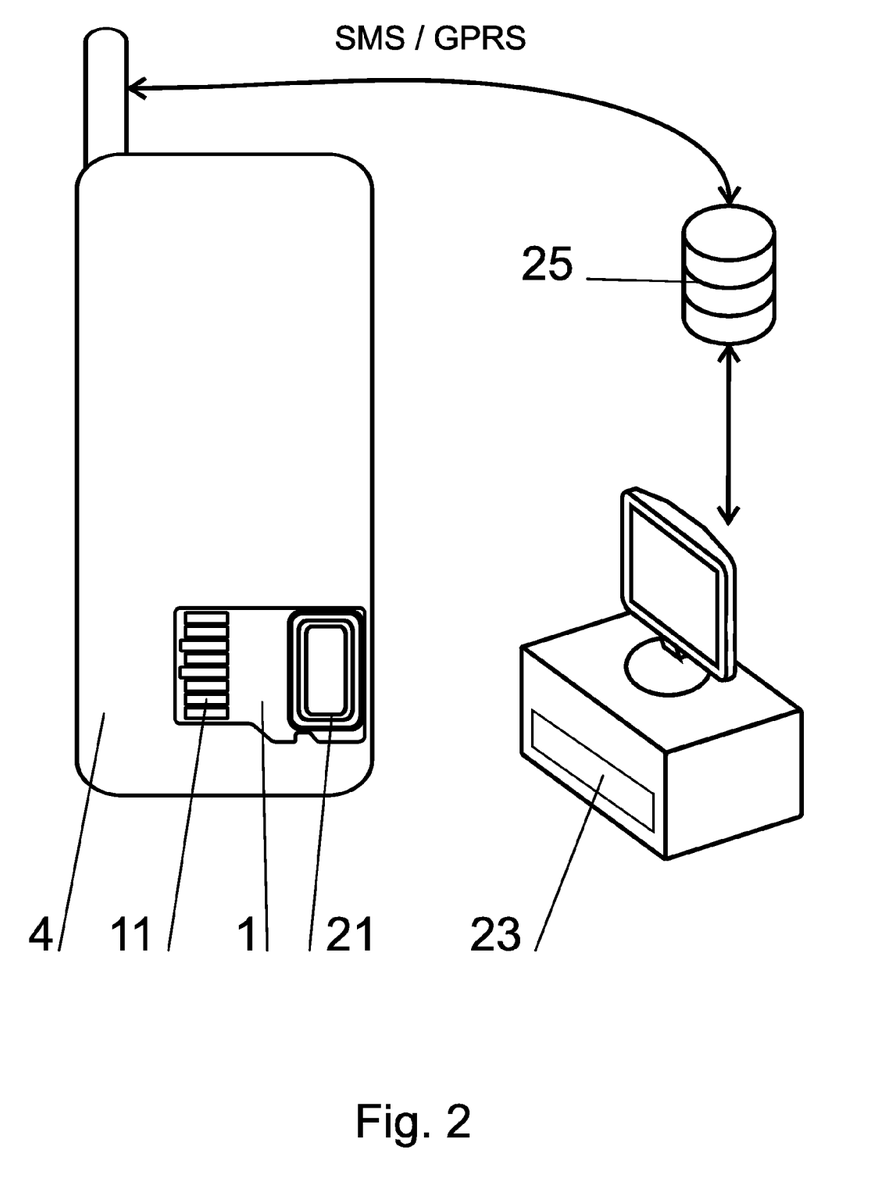

The flash memory 2 is divided into a secured and an unprotected part. In the unprotected part there is a space 15 for the freely accessible and visible data of the user and a space 20 for hidden system files, especially the records of the payment transactions that are processed by the payment terminal. In the secured part of the memory card there is a unit 8 holding operating system, in this example it is Linux, and above all the payment POS terminal application unit 5 where a payment POS terminal application is saved, in this case it is an application of EMV type. In this example, in the secured part of the memory 2 there is also download management unit 19 that is used for storing and software update management on the memory card 1. In case it is necessary to load/upgrade applications in the smart card chip 3, then the binary data of the application are loaded into the unprotected part of the flash memory 2, e.g. to the system data unit in the space 20 where data that are hidden to the user are stored. The download management unit 19 checks periodically, whether there is not any new file in the system data unit that should be loaded into the secure element 3. If yes, then a respective installation is run.

In the secured part of the memory 2 there is also the SCWS web server unit 18 that is used to manage applications in the Secure Element 3, except the EMV payment application. In the microcontroller 12 there is a memory space, where the operating system is stored (as a beginning and an end of the addressed area). The Hash value of the memory's capacity (digital signature) is stored into the microcontroller 12 during the first operating system and application save. Later on, it is not possible to change this data anymore, which ensures protection against prohibited software changes.

Several individual domains are created in the Secure Element of the smart card chip 3. In this example there are three of them used to hold three independent terminals' configuration data units 6 that belong to three different payment processors. Two parts of the Secure Element 3 contain two independent payment cards 7 with respective payment applications of the EMV type. The example given here, therefore describes a solution, which enables the user to pay by two different payment cards at three terminals while each of them belongs to a different payment processor. For example one of these payment processors can be a mobile phone network operator who connects his telecommunication services to the direct debit payment transaction processing services. On the Secure Element, there is also RSA encryption unit 14.

The memory card 1 also has its own NFC contactless communication element 13 with the antenna 21 placed on, respectively within the memory card 1. This configuration enables creation of NFC communication connection between a common phone without the NFC chip and relevant reader meeting the ISO 14443 standard.

In the Secure Element 3 there is also the non-financial application unit 16, that, in this example, is configured to operate as electronic contactless key for door opening.

The flash memory 2 controller 17 is in the secured part of the memory 2 and it manages data transfer between the mobile phone and the flash memory 2 on the memory card 1. The flash memory 2 controller 17 blocks the possibility of viewing the data or writing to the secured part of the memory 2 and also blocks the possibility to view the unprotected part of the memory 2 with the system data unit (reading and writing is permitted).

The payment POS terminal application runs on the removable memory card 1 that is inserted into the mobile communication device's slot 4 for additional hardware. The payment POS terminal application is loaded into the microcontroller 12 in the memory card 1 and subsequently the configuration data of the selected terminal's identity are loaded from the Secure Element 3. The selected payment card data are loaded from the Secure Element 3 into the microcontroller 12 that operates as a payment terminal. Which payment card data are loaded, depends on the user's choice.

The boot-loader 9 runs a change control of the payment POS terminal application before the payment POS terminal application itself is started. The payment POS terminal application is managed using keyboard and display of the mobile communication device 4. The mobile phone has a graphical GUI interface (Graphic User Interface) that enables communication between the user, memory card 1 and HOST processor. There is also push SMS technology in the phone. The payment POS terminal application is an SD microcontroller application 12 that enables on-line and off-line payments using the payment application on the microSD memory card 1. The payment is realized as "Card is present", which highly increases the security—the transaction is signed with the cryptogram and during each transaction the ATC counter increases by one, which means that it is not possible to generate unlimited number of transactions in order to get some keys. The client manages the payment POS terminal application through a GUI application that is installed in his own phone. In this example the payment POS terminal application, along with the microcontroller 12, forms a Generic POS terminal. In a different configuration, the Generic POS terminal can be formed of payment POS terminal application along with a computing element that is directly in the chip with the secure element. Subsequently, along with configuration parameters, they form EMBEDDED POS TERMINAL: Terminal_type 1×=terminal that belongs to a financial institution, 2×=a terminal that belongs to a merchant, 3×=a terminal that belongs to the card holder—Card holder terminal. The terminal's configuration data unit 6 contains the ID number of the terminal, PDOL data (Processing Option Data Object List), Terminal Risk Management, off-line batch file format, SMS gate on the HOST, IP address on the HOST, code to sign off-line transactions. The Payments can be off-line or on-line. The communication with the payment processor can be realized through SMS messages or through GPRS.

Example 3

Figure 4:
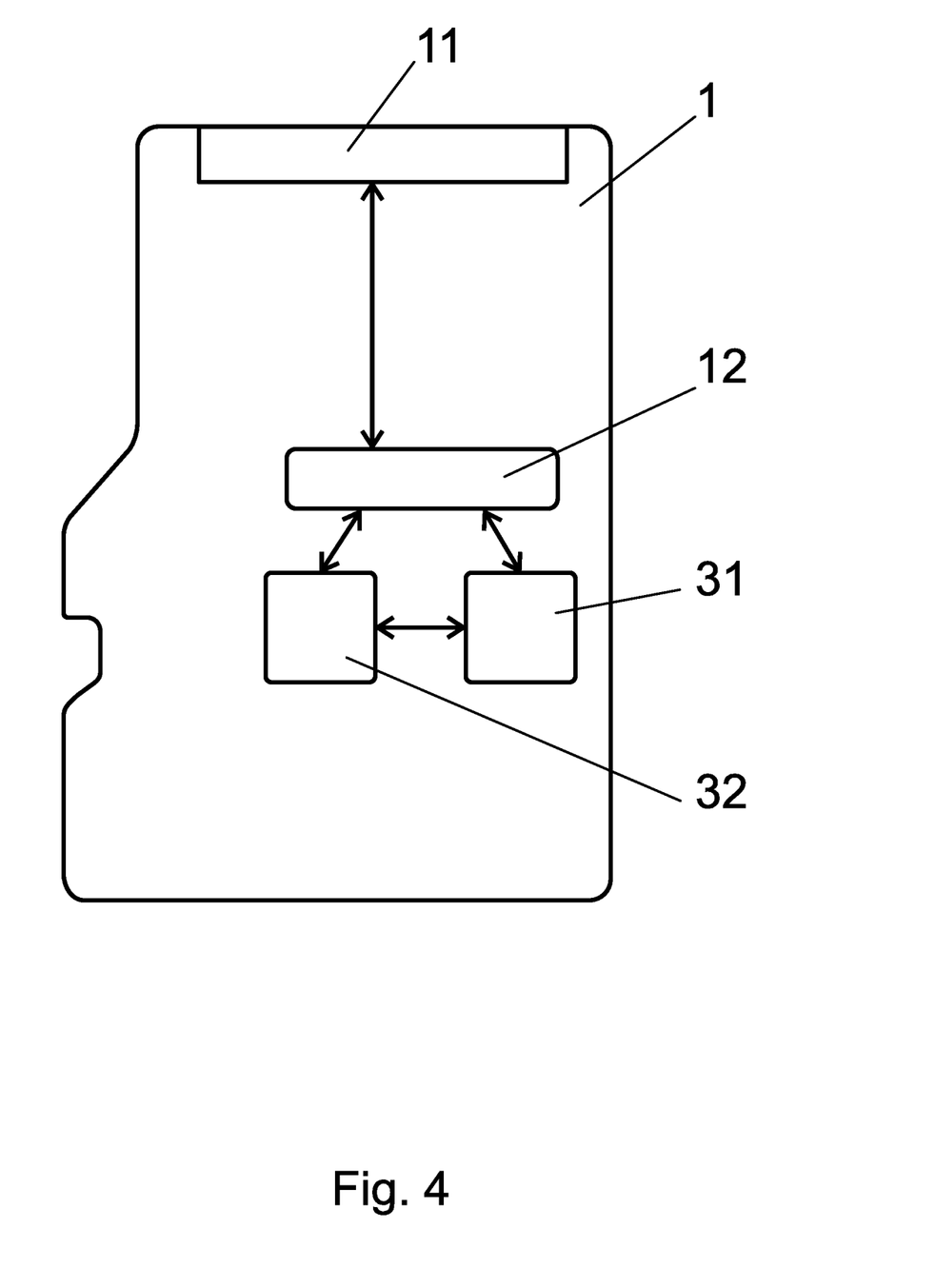
Figure 5:
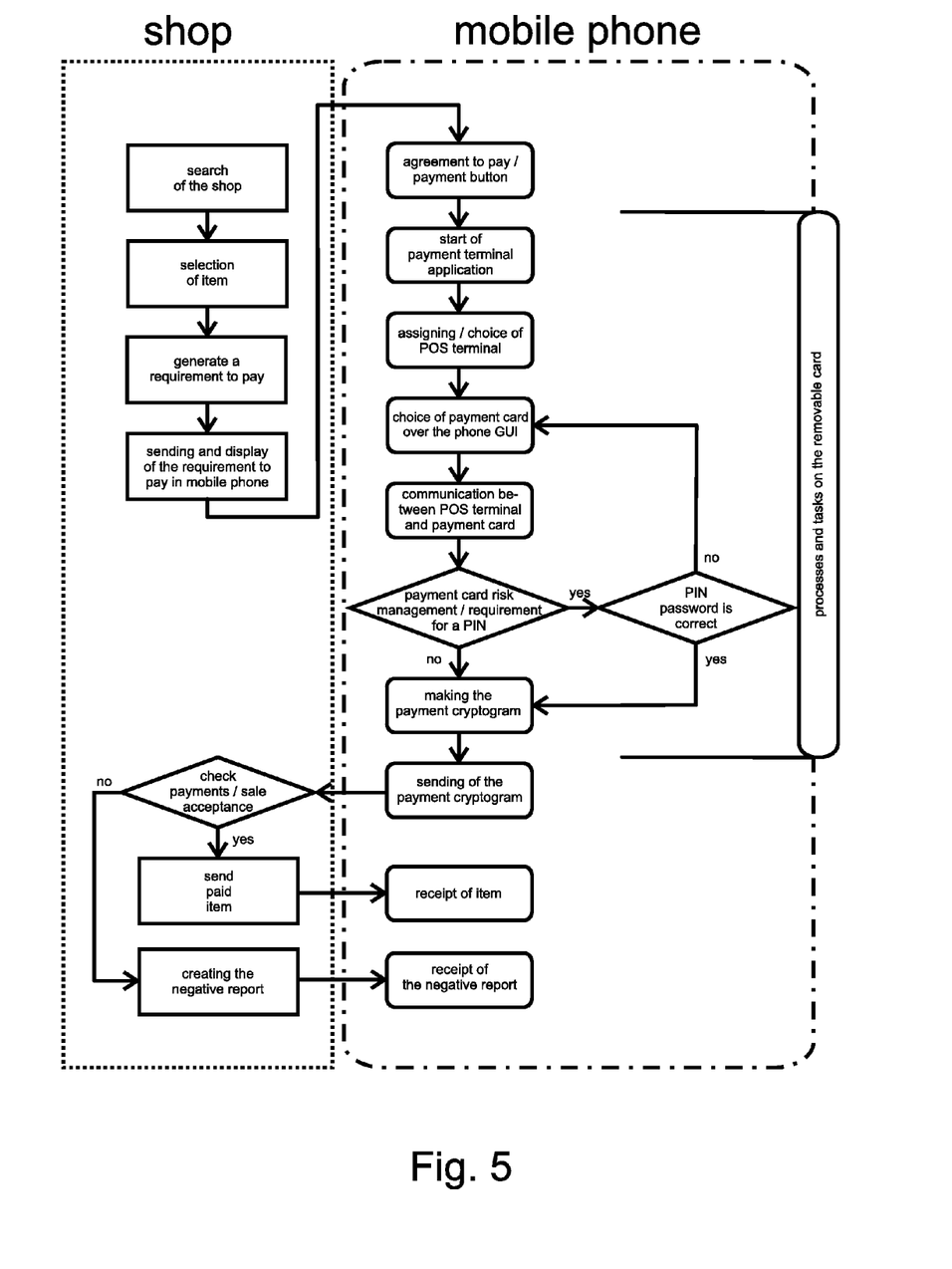

A removable memory card 1, which contains only a minimal set necessary for the realization of payments is described in this example. Its structure is shown in the FIG. 4. This kind of removable memory card is designed only to be sold as a pre-paid payment card with pre-entered amount of money and is intended e.g. to be sold to tourist coming from a country with different currency. The removable memory card 1 contains an interface 11 with contacts in accordance with the microSD specification. In the plastic body of the removable memory card 1 there are two Secure Elements 31, 32. In the first Secure Element 31 there are configuration data of the POS terminal generated by the pre-paid card system's operator. In the second Secure Element 32 there are one-time payment card's data. Along with the removable memory card 1, the commercial package contains also a paper carrier with a scrap field, in which there is a corresponding PIN code for the management of access to the payment card. The memory card 1 executes all the operations as a common POS terminal held by the merchant when connected to the paying customer's payment card. The mobile phone's 4 facilities are used for displaying and communication.

Example 4

In this example the system is supplemented for the payment terminal's application initiator 22. It can be in the form of a single-purpose device with the NFC communication element. In this example the initiator is connected to the output of the cash register 26, which will send information on the total required payment to the output. The initiator 22 creates a file which contains the payments value, information on the merchant's account and the request command. The initiator 22 sends this file to the mobile phone 4, which is applied to it, over the communication element 24. The reception of this file on the memory card 1 causes the launch of the payment POS terminal application. This solution enables to use the payment terminal in the mobile phone 4 of the user for direct debit payments in normal stores that do not have its own POS terminal.

INDUSTRIAL APPLICABILITY

The industrial applicability is obvious. According to this invention, it is possible to industrially and repeatedly manufacture and use POS payment terminals implemented into the memory cards, with one or also more payment cards in one memory card.

LIST OF RELATED SYMBOLS

1—a memory card
2—a memory
3—a secure element
31—the POS terminal's Secure Element
32—the payment card's Secure Element
4—a mobile communication device
5—a payment POS terminal application
6—a terminal's configuration data unit
7—a payment card unit
8—an operating system unit
9—a boot-loader unit
10—an internal microcontroller memory
11—an interface
12—a microcontroller
13—a communication element
14—an encryption unit
15—a freely accessible user's data space
16—a non-financial application unit
17—a flash memory controller unit 18—a web server unit
19—a download management unit
20—a data space hidden to the user
21—an antenna
22—an initiator
23—the payment receiver's computer
24—the initiator's communication element
25—the payment procession centre
26—cash register

What is claimed:

1. A point-of-sale (POS) payment terminal, comprising:
a memory, an interface, and a microcontroller connected with the memory and the interface;
a unit that contains a POS payment terminal application; and
a configuration data unit for configuration of a POS payment terminal that contains configuration data corresponding to the payment terminal application, the configuration data being stored in a secured part of the memory,
wherein the POS payment terminal, the payment terminal application and the corresponding configuration data are located on a removable memory card that is configured to be inserted into a hardware slot of a mobile communication device,
wherein the removable memory card includes a first secured memory that contains the configuration data unit and a second secured memory that contains a user's payment card unit, and
wherein the payment card unit is located separately from the configuration data, the first and second secure memories are linked to the microcontroller, and the microcontroller is linked to the interface for connection to circuits of the mobile communication device.

2. The payment terminal of claim 1, wherein the first and second secure memories are independent domains of a single secure element.

3. The payment terminal of claim 1, wherein the first secured memory is formed by a first secure element, and the second secured memory is formed by a second secure element on hardware that is separate from the first secure element.

4. The payment terminal of claim 1, wherein the memory card is an SD, miniSD, microSD, or M2 type card, and the interface is an SD or M2 type interface.

5. The payment terminal of claim 1, wherein the memory card has a data bus comprising at least two conductors.

6. The payment terminal of claim 1, wherein the microcontroller contains an undeletable internal memory and a bootloader unit for unauthorized interventions control in the POS payment terminal application.

7. The payment terminal of claim 1, wherein the memory card is equipped with a contactless communication element that is connected to a secure element and/or to the microcontroller.

8. The payment terminal of claim 7, wherein the memory card contains an antenna that is connected to a contactless communication element.

9. The payment terminal of claim 1, wherein the secure element contains at least two units with configuration data from different independent terminals.

10. The payment terminal of claim 1, wherein the secure element contains at least two units containing independent payment cards with corresponding payment applications.

11. The payment terminal of claim 1, wherein the memory has a secure portion wherein the payment terminal application is stored.

12. The payment terminal of claim 1, wherein the memory contains a memory controller unit, a download management unit, and a web server unit.

13. The payment terminal of claim 1, wherein the secure element contains a non-financial application unit.

14. The payment terminal of claim 1, wherein the memory has a space that contains data that is inaccessible by the user of the mobile communication device, and a space that contains data that is freely accessible by the user.

15. The payment terminal of claim 1, further comprising an initiator of the POS payment terminal application, and a unit for generating a value associated with a payment,
wherein the initiator contains a communication element that is compatible with the communication element on the removable memory card or with a short-distance communication element of the mobile communication device.

16. A method for direct debit payment transaction, the method comprising:
providing a point-of-sale (POS) payment terminal application on a removable memory card that is inserted into a hardware slot of a mobile communication device; and
executing the POS payment terminal application on the mobile communication device;
wherein the removable memory card contains a user's payment card unit, and communication with the payment card unit occurs via circuits of the removable memory card.

17. The method of claim 16, wherein the POS payment terminal application is loaded into a microcontroller located in the memory card, and, subsequently, configuration data associated with a selected payment terminal are loaded from a secure element.

18. The method of claim 17, wherein the configuration data are loaded from a secure element into the microcontroller, which then operates as a payment terminal.

19. The method of claim 18, further comprising initiating the POS payment terminal application, wherein, before or during initiation of the POS payment terminal application, a boot-loader unit runs a change control in the POS payment terminal application.

20. The method of claim 16, wherein the POS payment terminal application is managed through an input device of the mobile communication device.

21. The method of claim 16, wherein data associated with a requested payment amount are loaded into the POS payment terminal application from a separate initiator that sends the data associated with the required payment, along with an initiation command, over a contactless communication channel.

* * * * *